(12) United States Patent
Chang et al.

(10) Patent No.: US 10,864,995 B2
(45) Date of Patent: Dec. 15, 2020

(54) HYBRID AUXILIARY POWER UNIT FOR AIRCRAFT

(71) Applicant: Textron Aviation Inc., Wichita, KS (US)

(72) Inventors: Vernon Weng-Yew Chang, Wichita, KS (US); Charles Bernard Beuning, Wichita, KS (US); Adam Blake Wolfe, Bentley, KS (US)

(73) Assignee: Textron Innovations, Inc., Providence, RI (US)

( * ) Notice: Subject to any disclaimer, the term of this patent is extended or adjusted under 35 U.S.C. 154(b) by 323 days.

(21) Appl. No.: 15/927,241

(22) Filed: Mar. 21, 2018

(65) Prior Publication Data

US 2018/0273197 A1    Sep. 27, 2018

Related U.S. Application Data

(60) Provisional application No. 62/474,294, filed on Mar. 21, 2017, provisional application No. 62/474,303, (Continued)

(51) Int. Cl.
| | |
|---|---|
| *B64D 41/00* | (2006.01) |
| *H02J 1/00* | (2006.01) |
| *B64D 13/06* | (2006.01) |
| *H02J 7/00* | (2006.01) |
| *G05D 1/00* | (2006.01) |

(Continued)

(52) U.S. Cl.
CPC ............ *B64D 41/00* (2013.01); *B64D 13/06* (2013.01); *B64D 45/00* (2013.01); *B64F 5/40* (2017.01); *B64F 5/60* (2017.01); *G01F 9/001* (2013.01); *G05D 1/0011* (2013.01); *G07C 5/008* (2013.01); *H01M 2/1077* (2013.01); *H02J 1/00* (2013.01); *H02J 1/10* (2013.01); *H02J 7/007* (2013.01); *H02J 7/0063* (2013.01); *H02J 7/1423* (2013.01); *H02M 7/44* (2013.01); *B64D 2013/0611* (2013.01); *B64D 2041/002* (2013.01); *B64D 2045/0085* (2013.01); *B64D 2221/00* (2013.01); *H01M 2/20* (2013.01); *H01M 2/30* (2013.01); *H01M 10/425* (2013.01); *H01M 2010/4271* (2013.01); (Continued)

(58) Field of Classification Search
CPC ................ B64D 41/00; B64D 2221/00; B64D 2013/0611; H02J 7/1423; H02J 1/00; B64F 5/60; G07C 5/0008; G05D 1/0011; Y02T 50/56; H01M 2220/20
See application file for complete search history.

(56) References Cited

U.S. PATENT DOCUMENTS

| | | |
|---|---|---|
| 6,624,533 B1 | 9/2003 | Swanson et al. |
| 6,912,453 B2 | 6/2005 | Le Draoullec et al. |

(Continued)

*Primary Examiner* — Michael J Zanelli
(74) *Attorney, Agent, or Firm* — Erise IP, P.A.

(57) ABSTRACT

An auxiliary power unit (APU) for aircraft is provided. The APU includes one or more battery modules for storing electrical power and an integrated controller adapted to operate the one or more battery modules for electrically powering aircraft subsystems for preflight readiness. A remote interface is communicatively coupled with the integrated controller and is adapted for displaying data from the APU and for receiving user instructions for transmission to the integrated controller for governing flow of electrical current between the APU and the aircraft subsystems.

19 Claims, 10 Drawing Sheets

Related U.S. Application Data filed on Mar. 21, 2017, provisional application No. 62/474,310, filed on Mar. 21, 2017.

(51) Int. Cl.

| | | |
|---|---|---|
| *H01M 2/10* | (2006.01) | |
| *H02M 7/44* | (2006.01) | |
| *H02J 7/14* | (2006.01) | |
| *B64F 5/40* | (2017.01) | |
| *H02J 1/10* | (2006.01) | |
| *B64F 5/60* | (2017.01) | |
| *B64D 45/00* | (2006.01) | |
| *G01F 9/00* | (2006.01) | |
| *G07C 5/00* | (2006.01) | |
| *H01M 10/42* | (2006.01) | |
| *H01M 2/30* | (2006.01) | |
| *H01M 2/20* | (2006.01) | |

(52) U.S. Cl.
CPC .......... *H01M 2220/20* (2013.01); *Y02T 50/40* (2013.01); *Y02T 50/50* (2013.01)

(56) References Cited

U.S. PATENT DOCUMENTS

| | | |
|---|---|---|
| 7,983,809 B2 | 7/2011 | Cell et al. |
| 8,061,650 B2 | 11/2011 | Nguyen et al. |
| 8,694,235 B2 | 4/2014 | Adie |
| 2011/0256904 A1* | 10/2011 | Simmons ................ B60R 25/00 455/556.1 |
| 2012/0198875 A1 | 8/2012 | Tate, Jr. et al. |
| 2012/0318914 A1* | 12/2012 | Rajashekara .......... B64D 41/00 244/58 |
| 2014/0210399 A1 | 7/2014 | Urschel et al. |
| 2014/0287273 A1 | 9/2014 | Nguyen et al. |
| 2016/0046158 A1 | 2/2016 | Keller et al. |
| 2016/0204615 A1 | 7/2016 | Radun et al. |
| 2018/0118376 A1* | 5/2018 | Ehrstein ................... B64F 5/60 |

\* cited by examiner

HYBRID AUXILIARY POWER UNIT FOR AIRCRAFT

CROSS-REFERENCE TO RELATED APPLICATIONS

This application claims the benefit of each of U.S. Provisional Application No. 62/474,294 entitled Expedited Preflight Readiness System for Aircraft and filed on Mar. 21, 2017; U.S. Provisional Application No. 62/474,303 entitled Hybrid Auxiliary Power Unit for Connected Aircraft and filed on Mar. 21, 2017; and, U.S. Provisional Application No. 62/474,310 entitled Hot-Swappable Hybrid APU for Aircraft and filed on Mar. 21, 2017. The entireties of each of the aforementioned applications are incorporated by reference herein.

BACKGROUND

1. Field

Embodiments of this disclosure relate generally to systems and methods for preparing aircraft for flight, and more specifically to systems and methods for providing electrical power to initiate aircraft subsystems for preflight preparations.

2. Description of the Related Art

Conventionally, flight crew manually prepare aircraft subsystems prior to departure, which limits how soon an aircraft may be ready for departure following arrival of the crew. Conventional auxiliary power units (APUs) include a gas turbine, which create noise and exhaust, and which require ground personnel in attendance for safety, thereby limiting their use for unattended preflight preparations. Some prior art auxiliary power units have been disclosed.

US Patent Publication 2016/0185461 to Beuning et al. discloses a starter-generator motor and integrated auxiliary power unit configured to drive a vapor cycle cooling system compressor.

US Patent Publication 2014/0287273 to Nguyen et al. discloses a portable ground power source for starting aircraft that includes a rechargeable lithium ion battery pack and an integrated aircraft NATO 3-pin connector.

US 2014/0210399 to Urschel et al. discloses a portable lithium ion cell battery assembly for providing ground power to an aircraft, which includes 3-pin NATO connector for connecting without power cables.

US Patent Publication 2016/0204615 to Radun et al. discloses an aircraft power system with dual hybrid energy sources, including a battery and a non-battery power source, a generator and a power controller.

US Patent Publication 2012/0198875 to Tate et al. discloses an APU that includes an auxiliary fuel cell and combustion unit, which is integrated with a heating and refrigeration system of an electric vehicle.

U.S. Pat. No. 8,061,650 to Nguyen et al. discloses an APU for providing electrical power to aircraft subsystems and a controller for starting and stopping the APU based on threshold loads.

U.S. Pat. No. 7,983,809 to Kell et al. discloses an aircraft integrated support system that downloads vehicle data, processes the data to determine aircraft system status, and displays maintenance information to maximize aircraft readiness.

SUMMARY

In an embodiment, an auxiliary power unit (APU) for aircraft is provided. The APU includes one or more battery modules for storing electrical power, and an integrated controller adapted to operate the one or more battery modules for electrically powering aircraft subsystems for preflight readiness. The integrated controller is adapted to receive instructions remotely via a mobile device.

In another embodiment, a remotely operated system for preflight preparation of aircraft is provided. The system includes a plurality of preconditioning subsystems for preconditioning the aircraft in preparation for a flight, an auxiliary power unit (APU) having one or more battery modules for storing electrical power, the APU being electrically coupled with the plurality of preconditioning subsystems. The system further includes an integrated controller electrically and communicatively coupled with the APU and the plurality of preconditioning subsystems for monitoring the APU and the preconditioning subsystems and for controlling flow of electrical power between the APU and the preconditioning subsystems. A remote user-interface device is communicatively coupled with the integrated controller for displaying information from the APU and the plurality of aircraft preconditioning subsystems and for receiving user input for controlling the APU and the preconditioning subsystems.

In yet another embodiment, a system for remotely operating an auxiliary power unit (APU) of an aircraft is provided. The APU has one or more battery modules electrically coupled with a main battery, an electrical bus junction box, and an integrated controller. The integrated controller has a memory for storing software and a processor for executing instructions of the software. The integrated controller further includes an input/output data bus for transmitting and receiving data with the APU, the main battery, and the electrical bus junction box. A remote interface is communicatively coupled with the integrated controller and is adapted for displaying data from the APU and the main battery and for receiving user instructions for transmission to the integrated controller for governing flow of electrical current between the APU and the main battery and the electrical bus junction box.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

Light jets or rotorcraft typically are not equipped with auxiliary power units (APUs) to enable powering of aircraft subsystems prior to starting the aircraft's engines. Operation of a gas-turbine APU may be limited due to environmental restrictions (e.g., airport regulation of noise and air pollution), fuel consumption costs, and consideration of passenger comfort (e.g., noise). Ground power may not be available from an airport, especially for smaller aircraft operating out of remote airports. Attendance of ground personnel may be required to initiate operation of a gas-turbine APU or airport-provided ground power. Embodiments of the present disclosure enable unattended preflight operation of aircraft subsystems by using a hybrid APU that may be operated remotely, is quiet, and does not contribute to air pollution.

To prepare an aircraft for dispatch on a flight mission, the flight crew needs to perform pre-flight checks. The checks may consist of verifying that aircraft systems, structure, and flight controls are ready for flight and that the cockpit and cabin have been prepared for crew members and passengers to comfortably enter. Some of these aircraft system checks include checking engine oil level, tire pressure, fuel quantity, state-of-charge of any electrical system source (e.g., a main or auxiliary battery, or hydrogen gas level for fuel-cell power systems). Prior to dispatch, if these levels are determined to be low, the flight crew will have to request that mechanics of a fixed-base operator (FBO) at the airport replenish the levels.

In cold weather, some batteries may need to be preheated to a minimum operating temperature prior to departure. In hot or cold weather, the cockpit/cabin may need to be preconditioned (e.g., precooled in hot weather or preheated in cold weather) to provide a comfortable environment for passengers. If these preflight tasks cannot be started until the flight crew arrives, departure delays will ensue. Alternatively, arrival of the flight crew may occur well before arrival of the passengers.

In conventional aircraft, subsystems are typically activated by having flight crew or maintenance personnel in the cockpit to actuate switches. Once activated, these subsystems operate continuously until turned off or until the power source has been disconnected. A capability is lacking to set readiness targets for aircraft subsystems at a specific clock time (e.g., an expected time for flight crew arrival at the aircraft). Without establishing a timeframe for preflight readiness, a timeframe is lacking for optimizing energy usage to minimize energy consumption during unattended ground operations.

Figure 1:
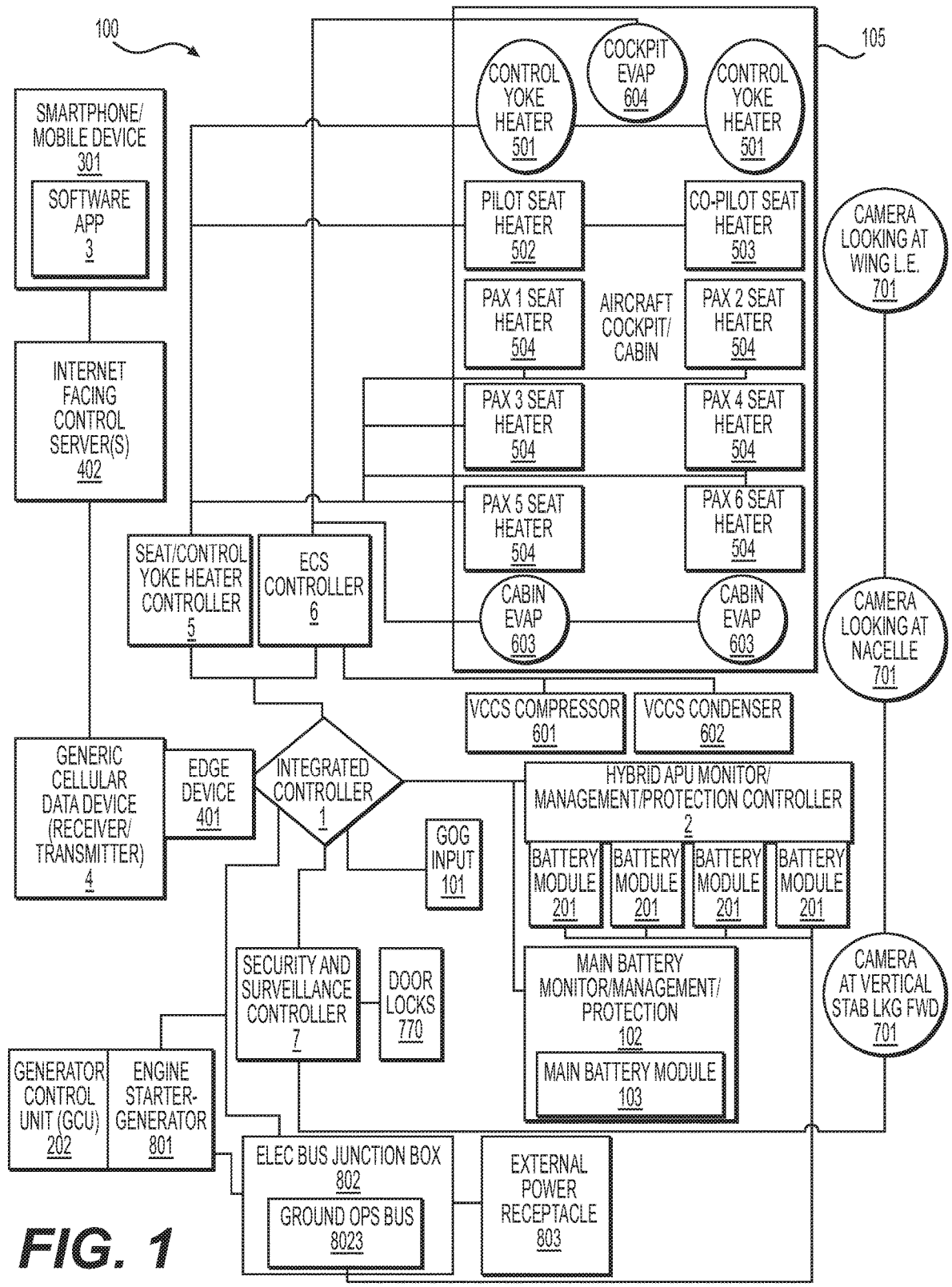
FIG. 1 is a block diagram representing an expedited preflight readiness system for aircraft, in an embodiment.

FIG. 1 is a block diagram representing an exemplary expedited preflight readiness system for aircraft 100. System 100 includes an integrated controller 1 configured to provide central control of system 100, and a hybrid auxiliary power unit (APU) 2 configured for powering system 100. System 100 may alternatively be powered by ground power provided by an airport via external power receptacle 803 or by an electrical generator powered by aircraft engines 801; however, hybrid APU 2 provides advantages over alternative options, as described below. A mobile device 301 (e.g., a smartphone) having an expedited preflight software application 3 may be used to access integrated controller 1. Mobile device 301 may be any remote user-interface device, without departing from the scope hereof, include a computer, laptop computer, tablet, smartphone, smart watch, etc. Exemplary features of software application 3 are described below in connection with FIG. 3. System 100 enables the flight crew to begin preflight preparation of an aircraft before arriving at the airport. An aircraft equipped with system 100 enables the flight crew to remotely monitor and start multiple aircraft subsystems via mobile device 301 while the aircraft is unattended on the ground and without the use of cockpit presets. If monitored levels are low, the flight crew may contact FBO mechanics to replenish these levels before the flight crew's arrival.

Figure 2:
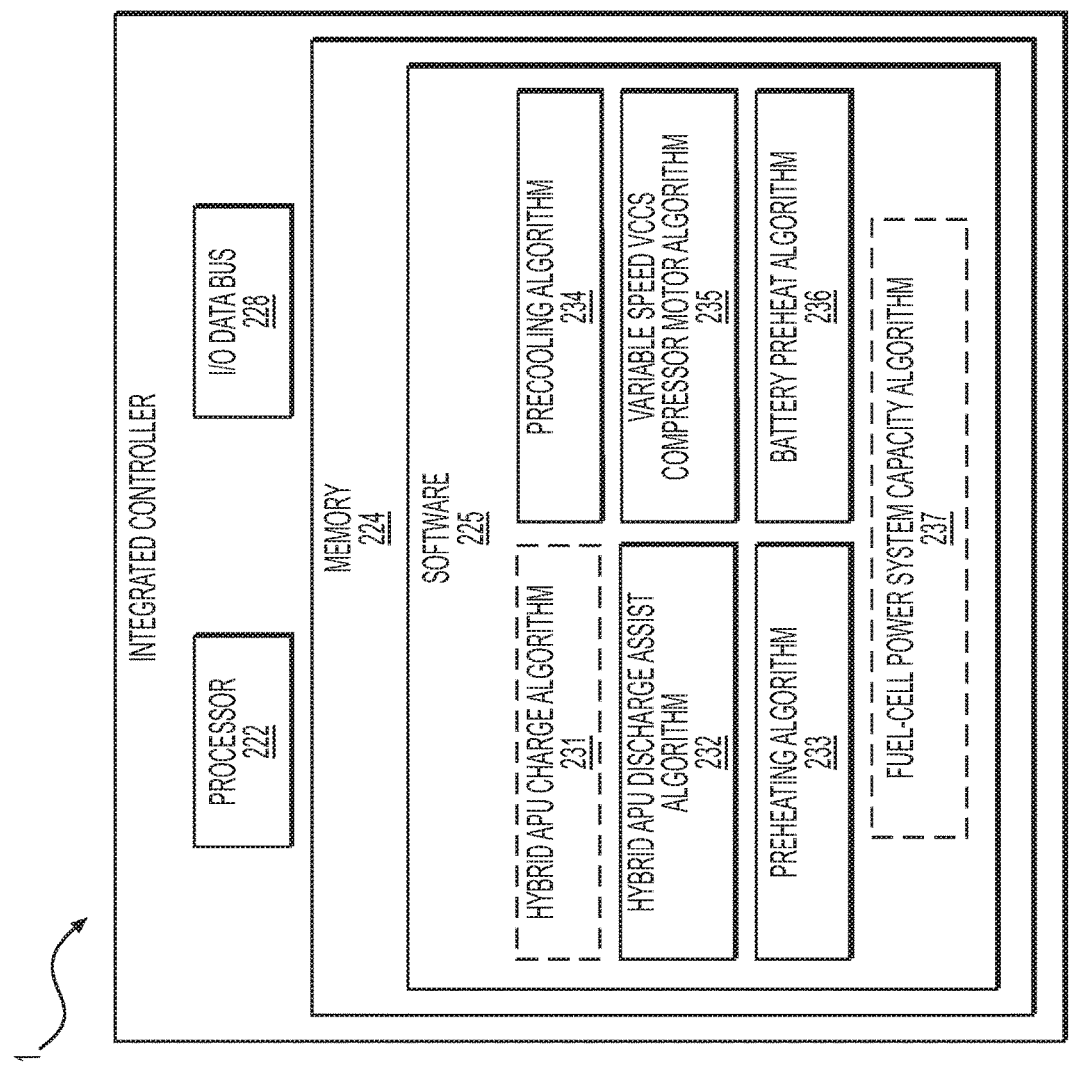
FIG. 2 is a block diagram of an integrated controller for the expedited preflight readiness system of FIG. 1.

FIG. 2 is a block diagram further illustrating integrated controller 1, FIG. 1. Integrated controller 1 may be one or more of a printed circuit board (PCB), a computer, a microcontroller, a microprocessor, or a programmable logic controller (PLC). Integrated controller 1 includes a memory 224, including a non-transitory medium for storing software 225, and a processor 222 for executing machine readable instructions of software 225. Memory 224 in some embodiments is a memory system that includes both transitory memory such as RAM and non-transitory memory such as, ROM, EEPROM, Flash-EEPROM, magnetic media including disk drives, and optical media. Software 225 may include look-up tables, formulas, and logical algorithms, such as algorithms 231-237, described below.

Integrated controller 1 further includes a multi-channel input/output (I/O) data bus 228 for communicating with a gear on ground (GOG) input 101, a main battery controller 102, hybrid APU 2, a seat/yoke heater controller 5, an environmental control subsystem (ECS) controller 6, and a security and surveillance controller 7. Note that some or all functions of seat/yoke heater controller 5, ECS controller 6, and a security and surveillance controller 7 may instead be performed by integrated controller 1. Integrated controller 1 is communicatively coupled via a wired and/or wireless communication device to a plurality of devices and subsystems, as described below in connection with FIG. 4. While awaiting commands from software application 3 of mobile device 301, integrated controller 1 may remain in a low power standby mode.

Mobile device 301 includes a memory (which is an example of memory 124, FIG. 1), including a non-transitory medium for storing software, and a processor for executing machine readable instructions of software. An interface enables a user to input instructions and view data, as further described below in connection with FIG. 3. Mobile device 301 includes a transmitter/receiver for communicating with integrated controller 1 via an internet facing control server 402, a generic cellular data device 4, and a gateway device 401, which are described below in connection with FIG. 4. Note that lines connecting blocks in FIG. 1 may represent communicative coupling for data/signal transmission and/or electrical coupling for providing electrical power, or both.

Hybrid APU 2, which is communicatively coupled to integrated controller 1, includes a plurality of battery modules 201 for storing and providing electrical power and circuitry configured for battery monitoring and protection. Battery modules 201 may include one or more of Nickel-Cadmium batteries, Lead-Acid batteries, and Lithium-Ion batteries, for example. Battery modules 201 may for example be located in aircraft side-racks in a parallel arrangement (e.g., a bank of battery modules). Battery modules 201 are configured to provide sufficient capacity to power integrated controller 1 and a communication subsystem (see e.g., FIG. 4), either continuously or intermittently, for an extended duration of aircraft inactivity. Status of battery modules 201 may be viewed remotely via mobile device 301, as described below in connection with FIG. 3. Intelligent algorithms 231-237, FIG. 2 may be used to efficiently manage energy usage by the APU, as further described below.

An advantage provided by using hybrid APU 2 is that aircraft subsystems may be operated when ground power is unavailable while still avoiding running of the aircraft engines. Running the aircraft engines or using a gas-turbine APU, each require ground personnel to be present and produce noise and air pollution that may be regulated by the airport. Running the VCCS with a Hybrid APU 2 may be between fifteen and thirty decibels (dBa) quieter than running a VCCS with a gas turbine engine/APU. Since hybrid APU 2 is not a combustion device, personnel do not need to be present for safe start-up or operation. Another advantage of hybrid APU 2 is that it provides non-essential power for responding to incoming status requests and commands from mobile device 301, which increases the connectivity of the aircraft. In other words, an aircraft equipped with hybrid APU 2 reliably has sufficient power for connecting to and operating aircraft subsystems remotely. Also, main aircraft batteries are required to be fully charged for take-off, so these are not available for preflight tasks without delaying departure.

The electrical junction box 802 is the core of the aircraft electrical distribution subsystem and may receive electrical power from various electrical power sources (e.g., an engine starter-generator 801, an external power cart, and a main battery module 103) and distributes electrical power to other aircraft subsystems (e.g., Avionics, Flight Controls, Environment Control Subsystem, Heater Control Subsystem, Security/Surveillance Subsystem, etc.). Hybrid APU 2 may be electrically coupled with the aircraft's subsystems through electrical junction box 802. A ground operations bus 8023 inside the electrical junction box 802 may be used to electrically couple the Hybrid APU 2 to a select group of aircraft subsystems for unattended ground operations.

Main battery module 103 may be electrically coupled to the electrical bus junction box 802. The main battery module 103 is monitored, managed, and protected via main battery controller 102. Status of main battery module 103 may be remotely viewed via mobile device 301, as described below in connection with FIG. 3. Hybrid APU 2 and main battery controller 102 are subsystem controllers that may be monitored via integrated controller 1. Electrical bus junction box controller 802 may further include an emergency bus 8022. An external power receptacle 803 and engine starter generator 801 may also be electrically coupled to electrical bus junction box 802.

Hybrid APU 2 includes a plurality of battery modules 201 that may be discharged partially or completely during use. Through bus bars and relays in the electrical junction box 802, battery modules 201 may be configured either in series or parallel, depending on the aircraft utilization requirement. This provides a benefit to aircraft in situations (e.g., engine start) that require a higher voltage (e.g., for higher torque), while other situations (e.g., preflight readiness operations or emergency in-flight power) require the nominal voltage.

Engine starter-generator 801, under control of a generator control unit (GCU) 202, may be used to recharge battery modules 201 and/or hybrid APU2 during flight or via ground operations bus 8023. Note that only one engine starter-generator 801 and one generator control unit 202 are shown in FIG. 1; however, more than one may be included system 100 (e.g., one engine starter-generator 801 and one generator control unit 202 per engine). Generator control unit 202, which provides charge control function for hybrid APU 2, may be a variable voltage generator control unit. When the engine starter-generator 801 is on-line, battery modules 201 and main battery module 103 may become high-current demanding loads if they are also on-line. To prevent excessive current draw, the generator control unit 202 may gradually step up the charge voltage for Hybrid APU charge control function. The gradual step up in charge voltage may be controlled from the integrated controller 1 and/or the generator control unit 202. When the charge voltage is gradually stepped up, the impedance of battery modules 201 and main battery module 103 limits the charge current by the I=V/R relationship. The regulated voltage output from the engine starter-generator 801 may be gradually increased while maintaining a maximum current output that does not cause excessive heating or damage to the engine starter-generator 801. Gradual escalation of the charge voltage may be performed using generator control unit 202.

Since the hybrid APU 2 may be connected to electrical bus junction box 802 through the ground operations bus 8023, stored electrical energy from the Hybrid APU 2 may be used to recharge main battery 103.

The cells in each battery module 201 may be internally configured in a unique combination of series and parallel arrangements to achieve a particular nominal voltage and capacity rating for the battery module. For various electrical bus subsystems of different aircraft (e.g, 12VDC, 28VDC, 115VAC, 270VDC, or 350VDC), hybrid APU 2 may be configured accordingly. Battery modules 201 of an individual nominal voltage and capacity may be collectively configured to provide a total nominal voltage and total capacity by arranging battery modules 201 in a combination of series and parallel arrangements to match the intended utilization scenario for each aircraft. This arrangement to achieve a higher total nominal voltage and total capacity may be achieved statically, by using unchangeable installed wiring and bus bars, or dynamically, by using relays and similar devices to change the total nominal voltage and capacity of the Hybrid APU 2 for a specified utilization scenario. One example is when the Hybrid APU 2 is used for normal unattended ground operations, the Hybrid APU 2 is at a nominal voltage matching the voltage of the aircraft electrical subsystem; however, if a higher voltage is needed for a particular use scenario such as starting an engine or recharging a lower voltage device, relays in the electrical junction box 802 may be actuated to achieve the required total nominal voltage.

The aircraft cockpit and cabin 105 include a control-yoke heater 501 and a pilot seat heater 502 for both the pilot and co-pilot (if applicable), as well as a plurality of passenger (PAX) seat heaters 504. Seat/yoke heater controller 5 is used to control heating of control-yoke heater 501, pilot seat heater 502, co-pilot seat heater 503, and passenger seat heaters 504. Seat/yoke heater controller 5 may include a PCB, a microcontroller, a microprocessor, or a PLC, for example. Additional electric heaters (not shown) may also be controlled by heater controller 5, such as heaters for cockpit/cabin air preheating, windshield-defrost, engine oil preheating, battery preheating, and wing leading-edge anti-icing/deicing, for example. Conventional aircraft typically use hot bleed air from an engine or a gas-turbine APU to provide cockpit/cabin air heating, requiring ground personnel to be present when combustion devices are in use. Heaters 501, 502, 503, and 504, as well as additional electric heaters (not shown), may be remotely controlled via mobile device 301.

Environmental control subsystem (ECS) controller 6 includes a controller for controlling air conditioning to the aircraft cockpit and cabin 105. ECS controller 6 may be used to control a vapor cycle cooling subsystem (VCCS), including a refrigerant compressor 601, a refrigerant condenser 602, at least one cabin evaporator 603, and a cockpit evaporator 604. ECS controller 6 may include a PCB, a microcontroller, a microprocessor, or a PLC, for example. Alternatively, ECS controller 6 may be incorporated within integrated controller 1. Cockpit and cabin temperature may be remotely controlled via mobile device 301. Cabin and cockpit evaporators 603, 604 may be independently switched on/off, either from cockpit/cabin switches, or remotely via mobile device 301.

In an embodiment, compressor 601 includes an electrically-powered, variable-speed compressor motor. Light jet aircraft, turboprop aircraft, and rotorcraft typically use electrical power to operate the VCCS, whereas medium to large jet aircraft operate an air cycle cooling system (ACCS) based on pneumatic power. In general, Lithium-ion batteries of various chemistries have varying amounts of internal impedance and energy density. To maximize energy density while limiting battery weight, Lithium-ion cells having a lower discharge rate may be used. However, VCCS compressor motors typically operate in only one of two states: off, or on at full speed. And, VCCS compressors are typically sized for the maximum expected heat load at the high end of the temperature operating range. Consequently, when using the electrically-powered VCCS, a high current demand may be placed on the power source (e.g., hybrid APU 2). Using a variable-speed VCCS compressor motor provides at least the following four advantages:

First, if low discharge rate Lithium-ion cells or low state-of-charge (SOC) battery modules 201 are used, the speed of the variable-speed VCCS compressor may be reduced such that battery modules 201 continue to provide a sufficient electrical output without exceeding any current limits or prematurely falling below a discharge-voltage threshold. However, low discharge rate cells limit air conditioning capacity and increase recharge duration. Lithium-ion cells are advantageously able to maintain similar voltage levels at high and low SOC.

Second, the speed of the variable-speed VCCS compressor may be reduced, thereby reducing wasted energy for appropriate situations, such as warm but not hot days, where full speed is not required.

Third, continuous operation of the variable-speed VCCS compressor at a low speed (e.g., lower than the maximum speed) provides a consistent and quieter environmental noise signature by avoiding intermittent high-current discharge surges from the batteries.

Fourth, continuous operation of the variable-speed VCCS compressor at different speeds enables easier estimation of energy usage and easier determination of a precooling profile (e.g., based on a constant cooling rate as opposed to a constant compressor speed with intermittent operation or varying duty cycle). A precooling algorithm 234, described below, may include compressor motor speed as a variable, which may be determined via a look-up table or formula, to determine the precooling profile.

Returning to FIG. 1, security and surveillance controller 7 provides control over door locks 770 and surveillance cameras 701, which may include a plurality of cameras such as a camera located on the vertical stabilizer looking forward, a camera located on a left and right wingtip looking respectively at a left and right nacelle, and a camera looking at a wing leading edge. Live views from the cameras may be displayed remotely via mobile device 301. Door locks 770 may include door lock actuators and door lock position monitors, for example, which may be monitored and controlled via mobile device 301. Door locks 770 and cameras 701 enable a user via mobile device 301 to remotely unlock the aircraft for allowing entry of ground personnel and remotely view activity at the aircraft, respectively.

System 100 may further include additional subsystems and monitoring devices not depicted in FIG. 1. For example, an avionics suite may be powered while the aircraft is on the ground for performing preflight checks, a fuel system monitor may include a fuel quantity indicator, and an engine system monitor may include several sensors such as an engine-oil-quantity indicator, all of which may be communicatively coupled with integrated controller 1. In certain embodiments, mobile device 301 may be used to operate hybrid APU 2 manually without integrated controller 1, in which case any equipment that is manually turned on may be powered via hybrid APU 2.

Using algorithms 231-237, FIG. 2, integrated controller 1 may monitor a state of electrical charge, or more commonly referred to as state-of-charge (SOC), from its available power sources and centrally coordinate the initiation and operation of selected aircraft subsystems to minimize energy waste, while meeting preflight readiness requirements. In addition to being used for preflight readiness, monitored aircraft subsystem data may be used for trend monitoring and predictive servicing.

A hybrid APU charge algorithm 231 evaluates the SOC of hybrid APU 2 and determines the charge voltage necessary for timely charging of battery modules 201 without excessive loading on engine starter-generator 801. Algorithm 231 is optionally located within integrated controller 1 but may instead be part of generator control unit (GCU) 202. Algorithm 231 is used to regulate output voltage during charging of battery module 201 to prevent excessive current and the resulting temperature increase from the engine starter-generator 801 on the ground or in-flight.

A hybrid APU discharge assist algorithm 232 may be used continuously during ground and flight operations. During ground operations, algorithm 232 determines when main battery module 103 is depleted and instructs hybrid APU 2 to recharge main battery module 103, alleviating the need for recharge via a ground power cart or engine-starter generator 801 (which would require running the aircraft's engines). During flight when the flight crew instructs hybrid APU 2 to electrically connect with electrical bus junction box 802, hybrid APU 2 may provide electrical current to reduce engine starter-generator 801 load, and thus engine load, during critical flight stages such as take-off. During an in-flight emergency or unexpected loss of an electrical power source, hybrid APU 2 may provide additional emergency electrical power.

In certain embodiments, algorithms 231 and 232 may each be used to control the recharging of hybrid APU2 via engine starter-generator 801, either during flight or on the ground.

A preheating algorithm 233 is used during cold weather to preheat the cabin and/or cockpit. Preheating algorithm 233 may be activated by the flight crew via a command from mobile device 301 to integrated controller 1 with one or more target temperatures and a completion time. Individual target temperatures may be selected for control yoke heaters 501, pilot seat heaters 502, and passenger seat heaters 504. In certain embodiments, the pilot/co-pilot control yoke may instead be an alternative control interface for operating aircraft, such as a control wheel or a side stick, in which case heater 501 is incorporated into the appropriate control interface. A windshield defrost completion time and temperature may also be selected. Preheating algorithm 233 evaluates the available charge capacity of hybrid APU 2, the outside air temperature (OAT), and the cockpit/cabin temperature against a look-up table or formula to determine the amount of time, operating profile of the heater systems, and the time needed for optimal just-in-time achievement of the preheating target temperature and time. In an embodiment, electric heaters provide only a fraction of the heat needed to fully heat the cockpit/cabin for reducing the cold weather experience, albeit without complete warmth. Preheating seats and the control yoke provides warmth even if the air remains cold.

A precooling algorithm 234 is used during hot weather to precool the cabin and/or cockpit. Precooling algorithm 234 may be activated by the flight crew via a command from mobile device 301 to integrated controller 1 with a target temperature and completion time. Precooling algorithm 234 evaluates the available charge capacity of hybrid APU 2, the OAT, and the cockpit/cabin temperature against a look-up table or formula to determine the amount of time, operating profile of the air conditioning system (e.g., ECS controller 6), and the time needed for optimal just-in-time achievement of the target temperature and completion time. Precooling algorithm 234 avoids achieving the target temperature substantially before the target completion time, which may cause excess energy loss from continuously running the air conditioner to compensate for heat load into the cabin.

A variable-speed VCCS compressor motor algorithm 235 uses a VCCS motor of compressor 601 to determine an operating profile for optimizing energy use, which reduces energy waste from running the compressor motor at full speed when only a minimal heat load exists.

A battery preheat algorithm 236 controls power-source discharge to preheat main battery module 103 and/or battery modules 201 until a predetermined temperature is achieved. Algorithm 236 may control heaters external to the battery or heaters internal to the battery.

For algorithms directed to a preconditioning operation (e.g., preheating 233, precooling 234, variable-speed VCCS compressor motor 235, and battery preheat 236), energy optimization includes determining the times for the appropriate subsystem to start-up, operate, and shutdown. In a scenario with insufficient energy available for achieving the target times, the flight crew is notified via mobile device 301.

An optional fuel-cell power capacity algorithm 237 evaluates an extent of continuous operation available from a fuel cell power system for aircraft that are optionally equipped with a fuel cell power system (not shown). For example, for a fuel cell power system having a source of stored hydrogen, algorithm 237 evaluates hydrogen availability by considering parameters such as storage pressure, stored gas temperature, and gas usage rate, to determine available energy for unattended ground operations.

Figure 3:
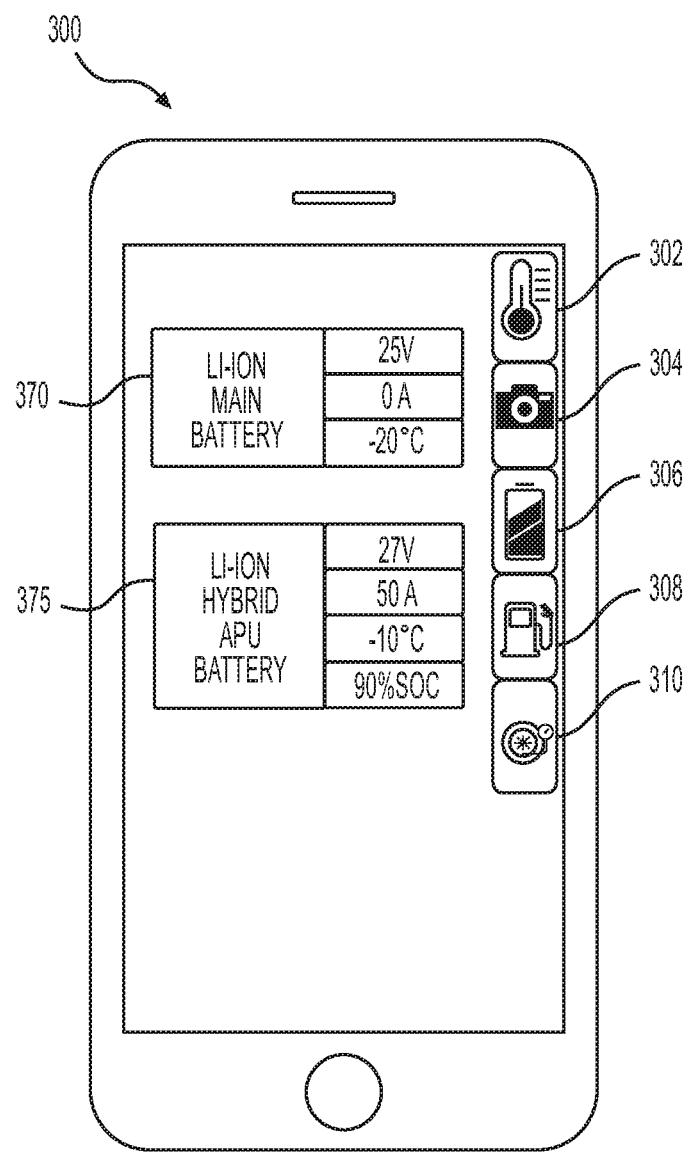
FIG. 3 shows a battery status page of the software application of FIG. 1, in an embodiment.

FIG. 3 shows battery status page 300 of software application 3 for use on mobile device 301, FIG. 1. As used in this application, the term "page" should be considered to include a particular configuration of displayed icons and information. A plurality of high-level buttons 302-310 provide access to other pages of software application 3 in addition to battery status page 300, which may be accessed from any page of software application 3 via battery button 306. As used in this application, the term "buttons" should be considered to include any device for providing input by the user. Example buttons include interactive icons or indicators displayed on a touch-screen that are touchable, icons/indicators displayed on a computer screen that are clickable (e.g., with a mouse), or actual physical buttons or switches. For mobile device 301 having a touch-screen, buttons are configured to receive input when touched by a user and provide access to additional information and/or options, which may be in the form of additional pages. Buttons, icons, and indicators may be continuously displayed as a user navigates between a plurality of pages (e.g., buttons 302-310), whereas other buttons, icons, and indicators may be specific to a particular page (e.g., indicators 370 and 375, described below, are specific for battery status page 300).

Other pages provided by software application 3 may include pages for temperature control via a temperature button 302, security and surveillance via a security button 304, battery status via battery level button 306, fuel status via a fuel button 308, and tire pressure information via a tire pressure button 310. Buttons 302-310 may include icons for rapid identification including a thermometer icon for temperature button 302, a camera icon for the surveillance and security button 304, a battery-level indicator for battery level button 306, a fuel-pump icon for fuel button 308, and a tire cross-section icon for tire pressure button 310.

Battery status page 300 includes a main battery indicator 370 configured to display status information for main battery module 103, FIG. 1, including for example, battery voltage (e.g., 25 Volts (V)), current (e.g., 0 Amps (A)), and temperature (e.g., −20° C.). A hybrid-APU battery indicator 375 displays status information for one or more battery modules 201 of hybrid APU 2, FIG. 1, including for example, voltage (e.g., 27 V), current (e.g., 50 A), temperature (e.g., −10° C.), and SOC (e.g., 90%). Battery indicators 370, 375 may be color-coded to provide an overall readiness indication. For example, main battery indicator 370 may be highlighted with red borders to indicate that the battery temperature is too low, whereas hybrid-APU battery indicator 375 may be highlighted with green borders to indicate that hybrid APU 2 is ready for use.

Figure 4:
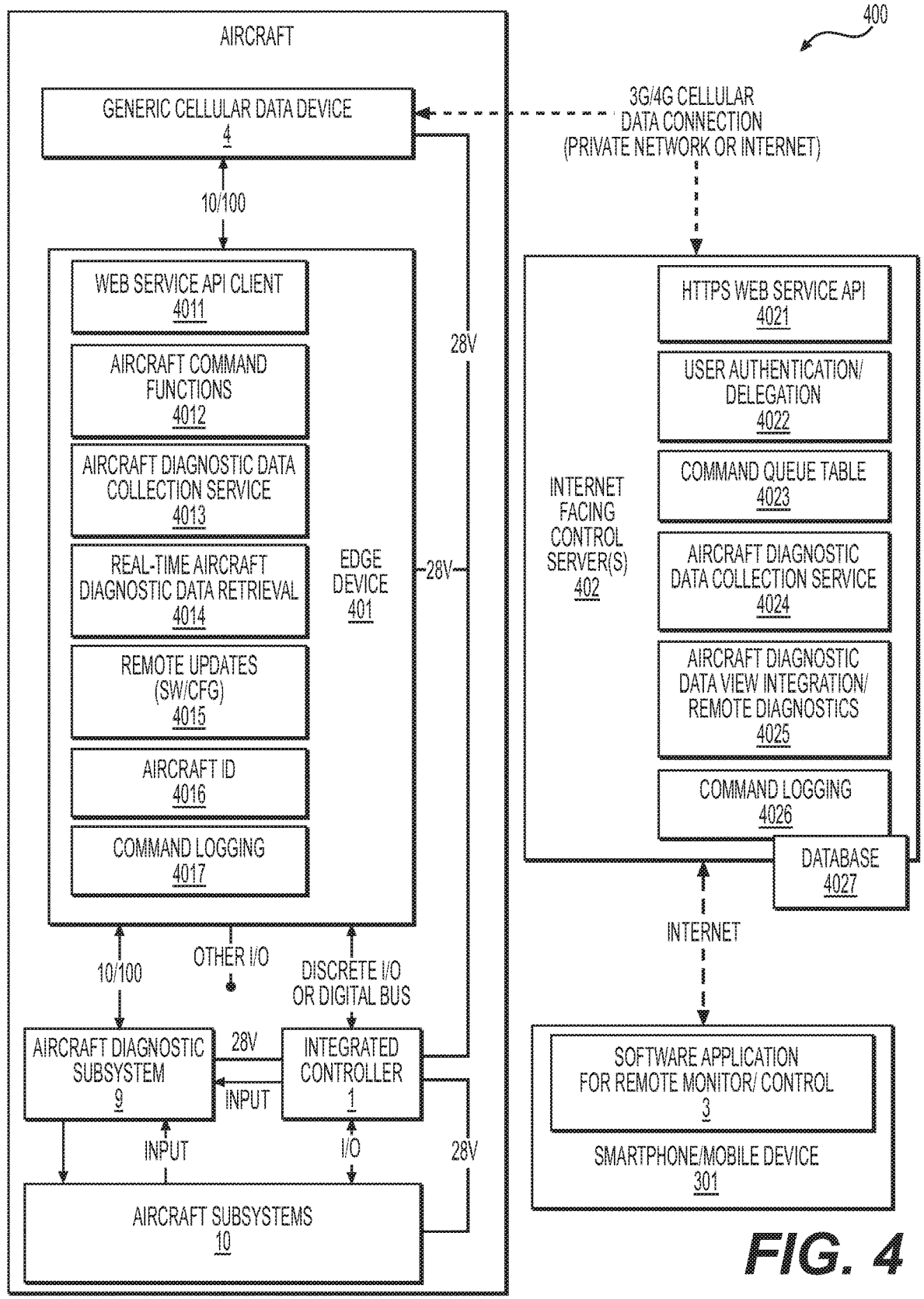
FIG. 4 is a block diagram showing a communication subsystem for communicative coupling between a mobile device and aircraft subsystems for the expedited preflight readiness system of FIG. 1.

FIG. 4 is a block diagram showing a communication subsystem 400 for communicative coupling between mobile device 301 and aircraft subsystems 10 via control server 402, generic cellular data device 4, gateway device 401, and integrated controller 1. Communicative coupling may be by one of a wired and/or wireless communication device. Aircraft subsystems 10 include main battery 102, hybrid APU 2, seat/yoke heater controller 5, ECS controller 6, security and surveillance controller 7, and sensors used to monitor various subsystems, for example.

Internet-facing control server 402 may be located remotely (e.g., not at the airport and not with mobile device 301). Internet transmission may use any combination of cellular, satellite, wireless fidelity (Wi-Fi), Ethernet, or similar communication networks. A secure web service application program interface (API) 4021 handles communication over the Internet. In certain embodiments, the web service interface on control server 402 may implement standardized protocols such as Advanced Message Queuing Protocol (AMQP) or Message Queuing Telemetry Transport (MQTT). For example, when a command is sent from mobile device 301, the command is routed through internet-facing control server 402 via web service API 4021. A user of mobile device 301 may be authenticated via a user authentication/delegation protocol 4022. The 4022 protocol may make use of standard authentication and authorization methods such as SSL/TLS, OAuth, LDAP, or Active Directory. Once the user is authenticated, the command sent from mobile device 301 is added to a command queue table 4023, which is sent to the aircraft via generic cellular data device 4 to gateway device 401. The main function of generic cellular data device 4 is to transmit and receive data to/from gateway device 401 through an Ethernet or similar data bus. Control server 402 may also implement a database 4027 to store transactional history for the various data to and from the aircraft. Control server 402 stores data from aircraft subsystems 10, and uses an aircraft diagnostic data collection service 4024 for collecting subsystem data, an aircraft diagnostic data view integration 4025 for providing data to mobile device 301 in a viewable format, and command logging function 4026 for providing a log of entered commands.

Gateway device 401 is a device that serves as an intermediary between integrated controller 1 and the generic cellular data device 4 and provides unified access to aircraft subsystems for all external query and command operations. In certain embodiments, gateway device 401 is an edge device, such as a router or integrated access device (IAD) that contains a plurality of input/output interfaces in order to interface with the integrated controller 1, diagnostic subsystem 9, or other aircraft systems 10. In some embodiments, gateway device 401 includes a web service API client 4011 for handling Internet communication. Gateway device 401 provides operations that may be performed by the mobile device 301 via relay through control server 402. Gateway device 401 may automatically and periodically attempt to establish a connection to control server 402 in order to receive commands or transmit system status. Gateway device 401 may utilize API client 4011 in order to establish a secure data communication path to control server 402. An aircraft command function 4012 determines whether a command is a data query or a command to activate/deactivate a specific function of aircraft subsystems 10. If the command is a data query it gets relayed to an aircraft diagnostic subsystem 9; otherwise, the command gets relayed to integrated controller 1. Following execution of an activation/deactivation command, integrated controller 1 returns a confirmation to mobile device 301 by way of traversing gateway device 401 and control server 402 via an Internet connection. Data query results are returned to control server 402 through the same path and made available for display on mobile device 301.

An aircraft diagnostic data collection service 4013 regularly collects and stores information from sensors monitoring subsystems throughout the aircraft. A real-time aircraft diagnostic data retrieval service 4014 may retrieve real-time data from data collection service 4013 upon request. A remote updates function 4015 provides automatic software updates of the latest software configuration. An aircraft ID 4016 provides identification information for the aircraft such as tail number or aircraft make, model, and serial number. A command logging function 4017 provides a log of entered commands.

Aircraft diagnostic subsystem 9, which is communicatively coupled to gateway device 401 and aircraft subsystems 10, collects data reported by aircraft subsystems 10. Example sensors include tire pressure sensors, engine oil level indicators, battery SOC sensors, and temperature sensing devices such as thermocouples and resistance temperature detectors. In an embodiment, aircraft diagnostic subsystem 9 sends interrogation requests for specific data parameters to a specified aircraft subsystem on demand. In an alternative embodiment, aircraft diagnostic subsystem 9 sends interrogation requests for specific data parameters to all sub-systems in real-time or on demand. In yet another embodiment, aircraft diagnostic subsystem 9 does not send interrogation requests but may receive any data sent to it.

In operation, flight crew may begin preflight preparation by remotely scheduling aircraft subsystems (e.g., using mobile device 301) to be activated and ready by a specific clock time, without requiring cockpit presets onboard the aircraft. For example, ECS controller 6 may be turned on for cockpit/cabin precooling, seat heaters 502, 504 may be turned on for preheating seats, and battery heaters may be turned on for heating battery modules 201 using mobile device 301, FIG. 3. Preflight operations may be powered using either an unlimited power source (e.g., a ground power cart plugged into the aircraft or a fuel-cell power system operating on aircraft jet fuel) or a limited power source (e.g., one or more main batteries, an extended capacity auxiliary battery such as hybrid APU 2, or a fuel cell power system operating on hydrogen stored in the aircraft).

After the aircraft has landed and been shut down, an unattended ground operations mode ensues. Battery modules 201 remain active to maintain integrated controller 1, gateway device 401, and generic cellular data device 4 powered. These devices may be continuously active in a normal-power mode, continuously active in a low-power mode, or intermittently active to reduce energy usage and occasionally determine if normal-power mode should be resumed. Power modes may be varied depending on the SOC of battery modules 201.

Figure 5:
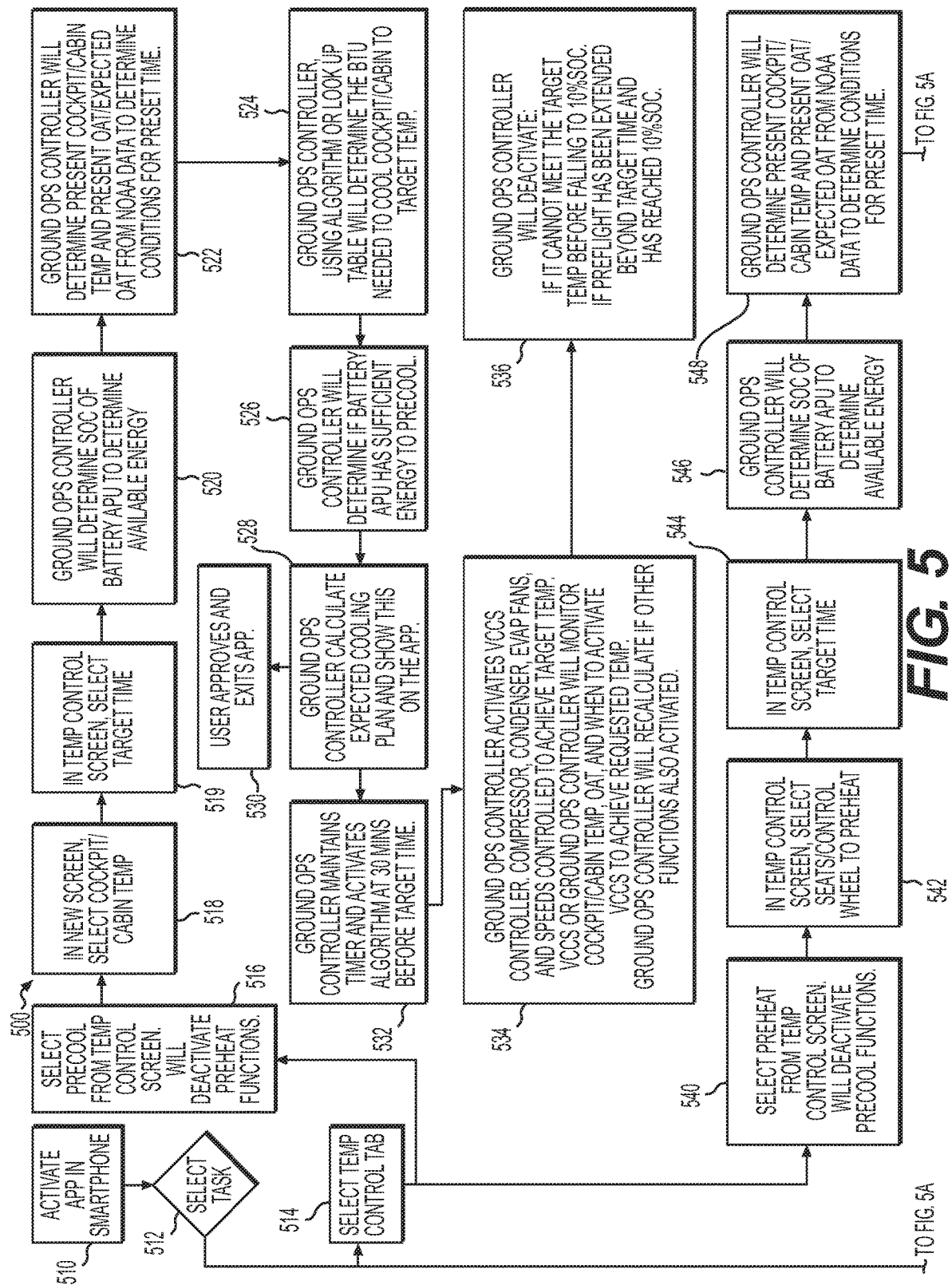
FIG. 5 is a flow diagram showing an expedited preflight readiness method for preconditioning an aircraft cockpit and cabin, in an embodiment.
Figure 5A:
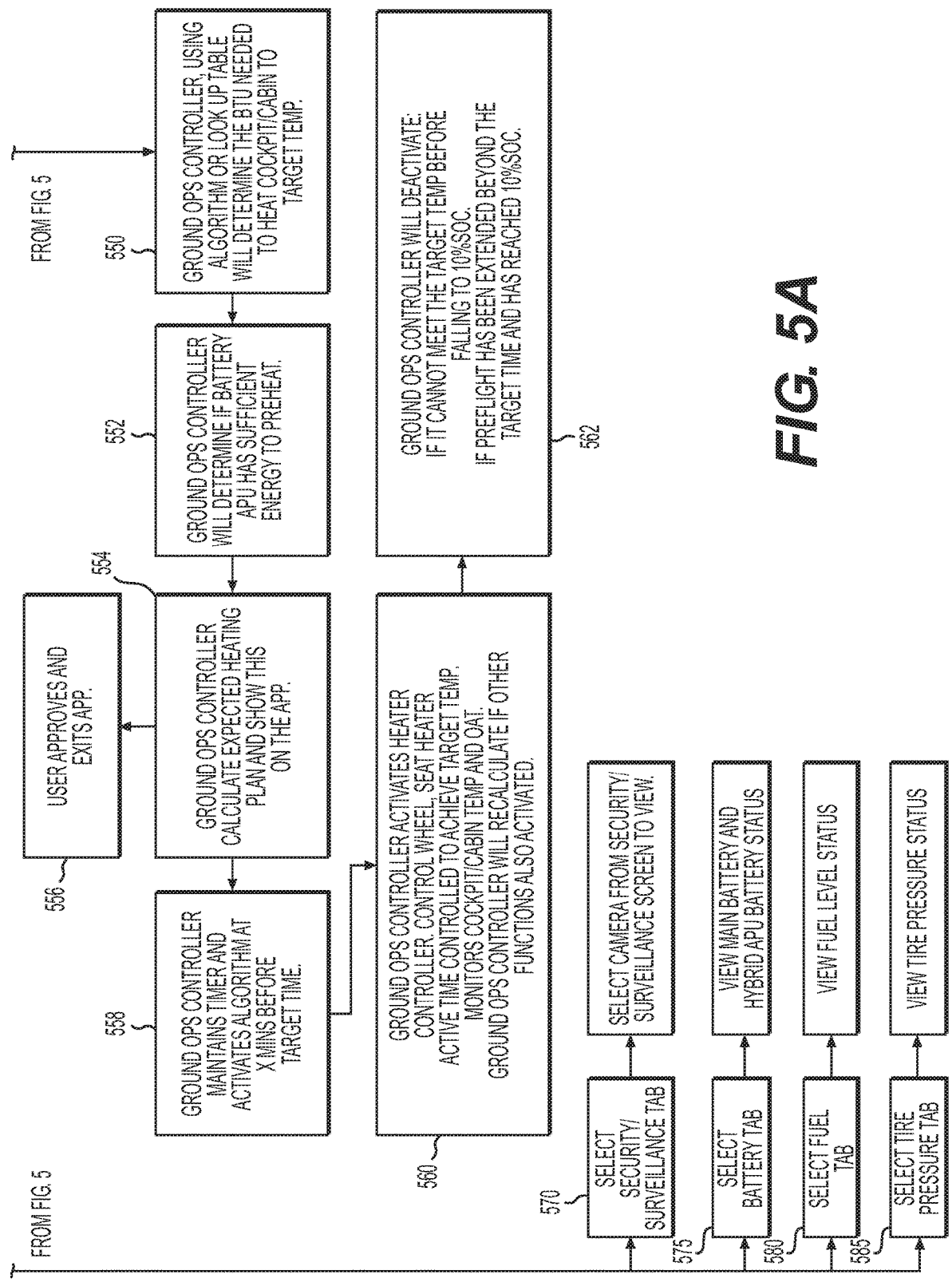

FIG. 5 is a flow diagram showing an exemplary expedited preflight readiness method 500 for preconditioning the aircraft cockpit and cabin. Preconditioning may include precooling or preheating the aircraft cockpit and cabin to a target temperature.

In a step 510, the user activates expedited preflight software application 3 of mobile device 301. This step avoids the user having to be in the aircraft cockpit and avoids needing cockpit preset instructions as part of any cockpit pilot interface.

In a step 512, the user selects a task list from software application 3. The task list may include lists of words or icons.

In a step 514, the user selects a temperature control page from the task list. In an example of step 514, temperature button 302, FIG. 3 is selected. If in step 514 the user selects a precool option, method 500 proceeds with step 516. Otherwise, if the user selects a preheat option, method 500 proceeds to step 540.

In a step 516, the user selects the precool option from the temperature control page. By selecting the precool option, preheat functions are automatically deactivated.

In a step 518, the user selects a cockpit/cabin target temperature in a new screen. In an example of step 518, cockpit/cabin target temperature is selected using mobile device 301.

In a step 519, the user selects a target time to achieve the target temperature. In an example of step 544, a target time for preheating is selected using mobile device 301.

In a step 520, ground-operations integrated controller 1 determines a SOC of hybrid APU 2 for estimating available energy.

In a step 522, integrated controller 1 determines a current cockpit/cabin temperature, a current outside air temperature (OAT), and an expected OAT for the target time from National Oceanic and Atmospheric Administration (NOAA) data for example, and determines the current and expected difference between cockpit/cabin temperature and OAT.

In a step 524, integrated controller 1 determines the energy (e.g., amount of British thermal units (BTUs))

needed to cool the cockpit/cabin to the target temperature based on a lookup table or formula.

In a step 526, integrated controller 1 determines if hybrid APU 2 has sufficient energy to accomplish the precool target temperature in the target time.

In a step 528, integrated controller 1 calculates an expected cooling plan and displays the cooling plan on software application 3 of mobile device 301. If insufficient time exists to meet the target temperature within the target time, integrated controller 1 may determine the coolest possible temperature achievable by the target time for display on mobile device 301.

In a step 530, software application 3 waits for the user to approve the cooling plan. Once the user approves the cooling plan, the user may exit from software application 3.

In a step 532, integrated controller 1 maintains a timer and activates the cooling plan at a predetermined amount of time prior to the target time. The predetermined amount of time may depend upon the current cabin/cockpit temperature, the current OAT, the expected OAT, and the available energy of hybrid APU 2, among other things. For example, integrated controller 1 may activate the cooling plan thirty minutes prior to the target time.

In a step 534, integrated controller 1 activates ECS controller 6, which operates VCCS compressor 601, VCCS condenser 602, cabin evaporators 603, and cockpit evaporator 604 to cool the cockpit/cabin air temperature. The controller of ECS controller 6 determines the duty cycle of controllable parameters, such as percentage of time active, time duration, fan speed/motor speed, and louver/orifice size of each component. While cooling, ECS controller 6 monitors the temperature and the activation of any subsystems that may increase heat load. If necessary, ECS controller 6 may dynamically adjust component performance to maintain the planned precooling profile to achieve the target temperature by the targeted time.

In a step 536, integrated controller 1 deactivates, thereby completing precooling of the cockpit/cabin. Integrated controller 1 may prematurely deactivate cooling if, for example, the SOC of battery modules 201 falls below 10%.

In a step 540, the user selects the preheat option from the temperature control page of mobile device 301. The temperature control page may be accessed via temperature button 302, FIG. 3. By selecting the preheat option, precool functions are automatically deactivated.

In a step 542, the user selects a preheat target temperature. In an example of step 542, cockpit/cabin target temperature is selected using mobile device 301. In another example of step 542, mobile device 301 may be used to individually turn on one or more of pilot and/or co-pilot control-yoke heaters 501, pilot seat heater 502, co-pilot seat heater 503, and passenger seat heaters 504, FIG. 1, as well as other heaters (not shown) including hot air blowers, for example.

In a step 544, the user selects a target time for preheating. In an example of step 544, mobile device 301 is used to select a target time for preheating.

In a step 546, integrated controller 1 determines the SOC of hybrid APU 2 for estimating available energy.

In a step 548, determines a current cockpit/cabin temperature, a current OAT, and an expected OAT for the target time from NOAA data for example, and determines the current and expected difference between cockpit/cabin temperature and OAT.

In a step 550, integrated controller 1 determines the energy (e.g., an amount of BTUs) needed to heat the cockpit/cabin to the target temperature based on a lookup table or formula.

In a step 552, integrated controller 1 determines if hybrid APU 2 has sufficient energy to accomplish the preheat target temperature in the target time.

In a step 554, integrated controller 1 calculates an expected heating plan and displays the heating plan on software application 3 of mobile device 301. If insufficient time exists to meet the target temperature within the target time, integrated controller 1 may determine the warmest possible temperature achievable by the target time for display on mobile device 301.

In a step 556, software application 3 waits for the user to approve the heating plan. Once the user approves the heating plan, the user may exit from software application 3.

In a step 558, integrated controller 1 maintains a timer and activates the heating plan a predetermined amount of time prior to the target time. The predetermined amount of time may depend upon the current cabin/cockpit temperature, the current OAT, the expected OAT, and the available energy of hybrid APU 2, among other things. For example, integrated controller 1 may activate the heating plan X minutes prior to the target time, where X is a non-negative integer.

In a step 560, integrated controller 1 activates ECS controller 6, which operates control yoke heaters 501, pilot seat heaters 502, and passenger seat heaters 504, FIG. 1. While heating, ECS controller 6 monitors the temperature and the activation of any subsystems that may alter the heat load. If necessary, ECS controller 6 may dynamically adjust component performance to maintain the planned preheating profile to achieve the target temperature by the target time.

In a step 562, integrated controller 1 deactivates all heaters, thereby completing preheating of the cockpit/cabin. Integrated controller 1 may prematurely deactivate heating if, for example, the SOC of battery modules 201 falls below 10%.

Other features of method 500 include the following: a security and surveillance feature 570 to provide a selection of live views from security cameras and to control door locks; a battery status 575 to provide status information for main battery 103 and battery modules 201 (see e.g., FIG. 3), a fuel status 580 to provide aircraft fuel-level status; and, a tire pressure 585 to provide tire pressure status. Using mobile device 301, the user may select security and surveillance feature 570 from security and surveillance button 304, battery status 575 from battery level button 306, fuel status 580 from fuel button 308, and tire pressure 585 from tire pressure button 310, FIG. 3.

Figure 6:
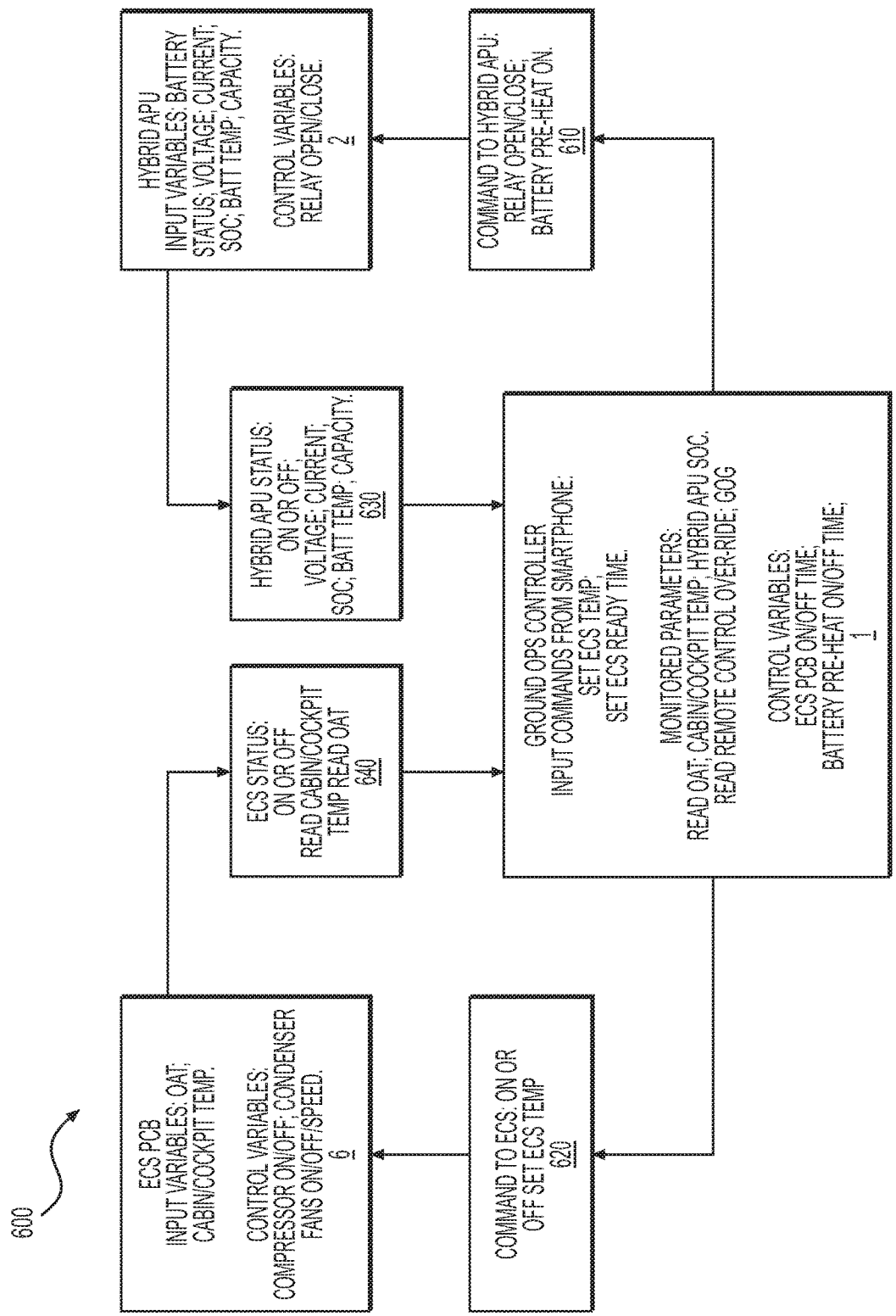
FIG. 6 is one embodiment of a control diagram for the expedited preflight readiness system of FIG. 1.

FIG. 6 is an exemplary control diagram 600 for expedited preflight readiness system 100. Specifically, control diagram 600 shows input and control variables of integrated controller 1, ECS controller 6, and hybrid APU 2, and commands between them for precooling the cockpit/cabin. Input commands from mobile device 3 for integrated controller 1 include setting the targeted temperature and targeted time for preheating or precooling the cabin/cockpit. Parameters that are monitored by integrated controller 1 include OAT, cabin/cockpit temperature, SOC of hybrid APU 2, remote control override, and GOG 101. Control variables include an on/off setting for ECS controller 6 as a function of time and a battery preheat on/off setting as a function of time. Output 610 from integrated controller 1 to hybrid APU 2 includes commands for an open/close relay command and a battery preheat command. Output 620 from integrated controller 1 to ECS controller 6 includes commands 620 for turning ECS controller 6 on or off and to set a target temperature for precooling or preheating.

Input variables for hybrid APU 2 include battery status for battery modules 201, which may include voltage, current, SOC, temperature, and capacity. Control variables include an open/close relay. Output 630 from hybrid APU 2 to integrated controller 1 includes status information such as on or off, voltage, current, SOC, battery temperature and capacity.

Input variables for ECS controller 6 include OAT and cabin/cockpit temperature. Control variables include on/off for compressor 601 and condenser 602, as well as on/off and speed control for evaporators 603, 604. In embodiments having a variable-speed VCCS compressor motor, compressor motor speed may also be an optional control variable. Output 640 from ECS controller 6 to integrated controller 1 includes on/off status, OAT, and cabin/cockpit temperature.

Figure 7:
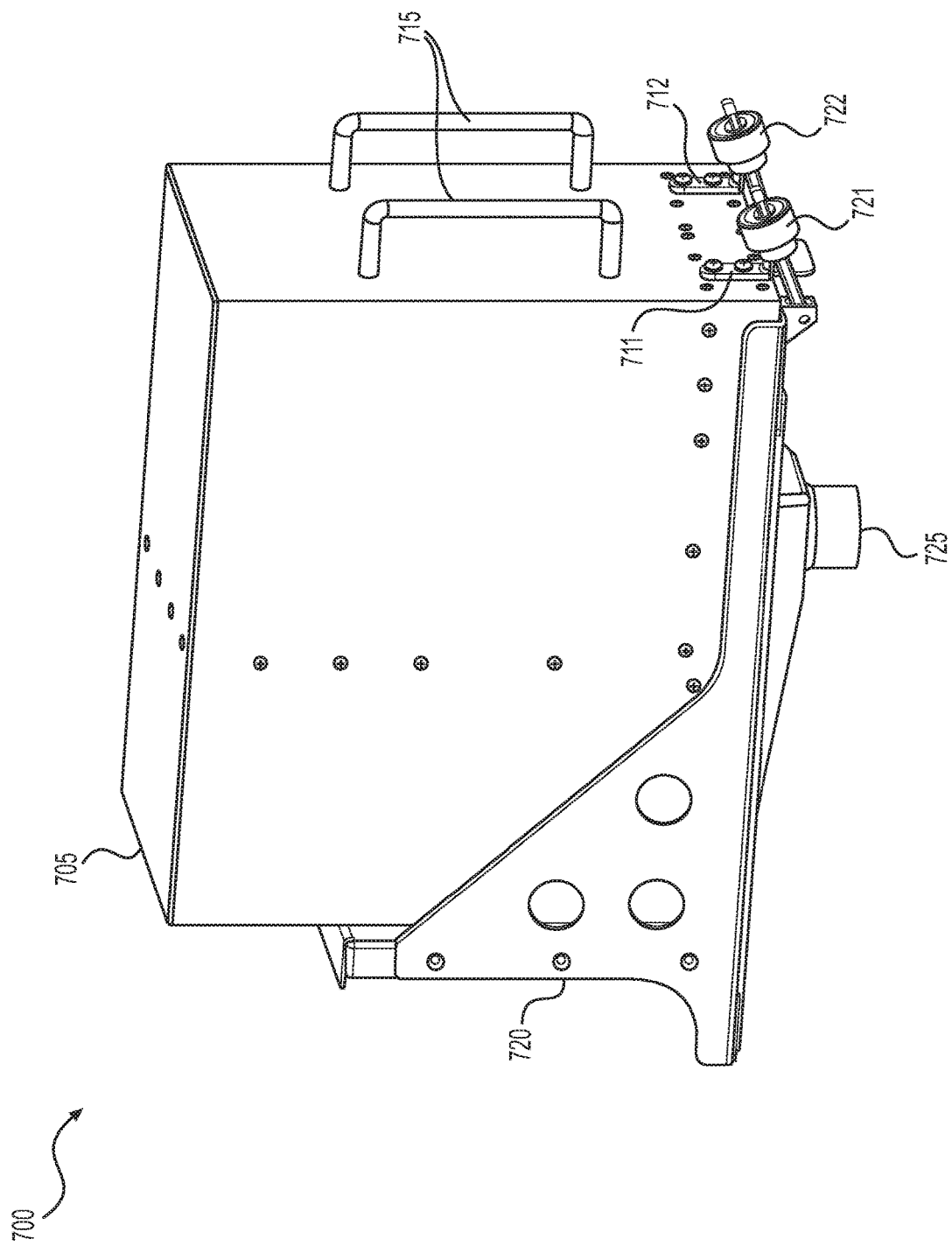
FIG. 7 shows a perspective view of a hot-swappable APU for aircraft, in an embodiment.

FIG. 7 shows a perspective view of a hot-swappable hybrid APU 700 for aircraft. Hybrid APU 700 is an example of hybrid APU 2, FIG. 1, and includes a rack 720 configured for receiving a battery module 705. Rack 720 may in certain embodiments be any electrical connection, such as an electrical receptacle or electrical connector, configured for receiving battery module 705. Battery module 705 may include one or more rechargeable batteries, such as a parallel arrangement of rechargeable batteries. Rack 720 may be installed in one or more flight-crew accessible locations of an aircraft. Battery modules 705 may be mounted behind lockable doors for security. Battery module 705 is equipped with handles 715 and has a size and weight acceptable for an individual to easily install in, and uninstall from, rack 720 without the aid of tools or other equipment. Rack 720 may include a mechanism for securing battery module 705 thereto by hand. For example, a pair of hold downs 721, 722 are configured for turning by hand to tighten onto a matching pair of hooks 711, 712 mounted to battery module 705.

Removal of battery module 705 is further simplified by a "hot swap" capability. The terms "hot swap" or "hot swappable" as used herein refer to an ability to plug and unplug battery module 705 in and out of rack 720 without shutting down the aircraft electrical subsystem, enabling battery module 705 to be mounted or unmounted while its batteries are charging or discharging. Once removed from rack 720, battery module 705 may include electronics to monitor battery status, and the battery may remain in a low-power mode to enable extended-duration storage or may be completely turned off.

Battery module 705 may include electrochemical cells, bus bars, heat transfer media, insulation, sensors, protection circuitry, power and signal connectors, and a container with venting provisions. Critical sensors inside module 705, for cell-voltage sensing, current sensing, and temperature sensing, may be located adjacent to the cells. Rack 720 may include a vent 725 configured for venting heat from battery module 705 to the aircraft skin, for example. Combinations of monitoring, cell management/balancing, and protection circuitry may be placed in module 705 and/or rack 720. Protection circuits may be located inside module 705 (e.g., either collocated with the cells or in an isolated partition) or installed outside the module (e.g., in rack 720 or elsewhere in the aircraft).

For each battery module 705 and rack 720 mounted together, active and passive protection circuits prevent the cells from overheating, overcharging, over-discharging, or from having an overvoltage, under-voltage, cell-voltage imbalance, or overcurrent state. Active protection circuits may consist of electronic switches, relays, metal-oxide semiconductor field-effect transistors (MOSFETs), or similar electronically-activated current-interrupt devices. Passive protection circuits may consist of diodes, thermal fuses, high-current fusible links, or similar physically-activated current-interrupt devices.

Electrochemical cells within battery module 705 may be charged via a bulk charge process that conducts a large magnitude electrical current (e.g., on the order of amps) through power terminals (e.g., for an 8-cell series, a negative terminal is common to a first-cell negative, and a positive terminal is common to an eighth-cell positive). Alternatively, a top/trickle/cell-balance charge may be used to conduct small magnitude of electrical current (e.g., on the order of milli-amps) through each cell's power terminals (e.g., for an 8-cell series, through the negative and positive terminal of each cell). A combination of current interrupt devices may be used for bulk charge and top/trickle/cell-balance charge circuits. Cell voltage comparators may be used between adjacent cells or all cells to identify which top/trickle/cell-balance charge circuits to interrupt for optimal cell-voltage balancing.

Figure 8:
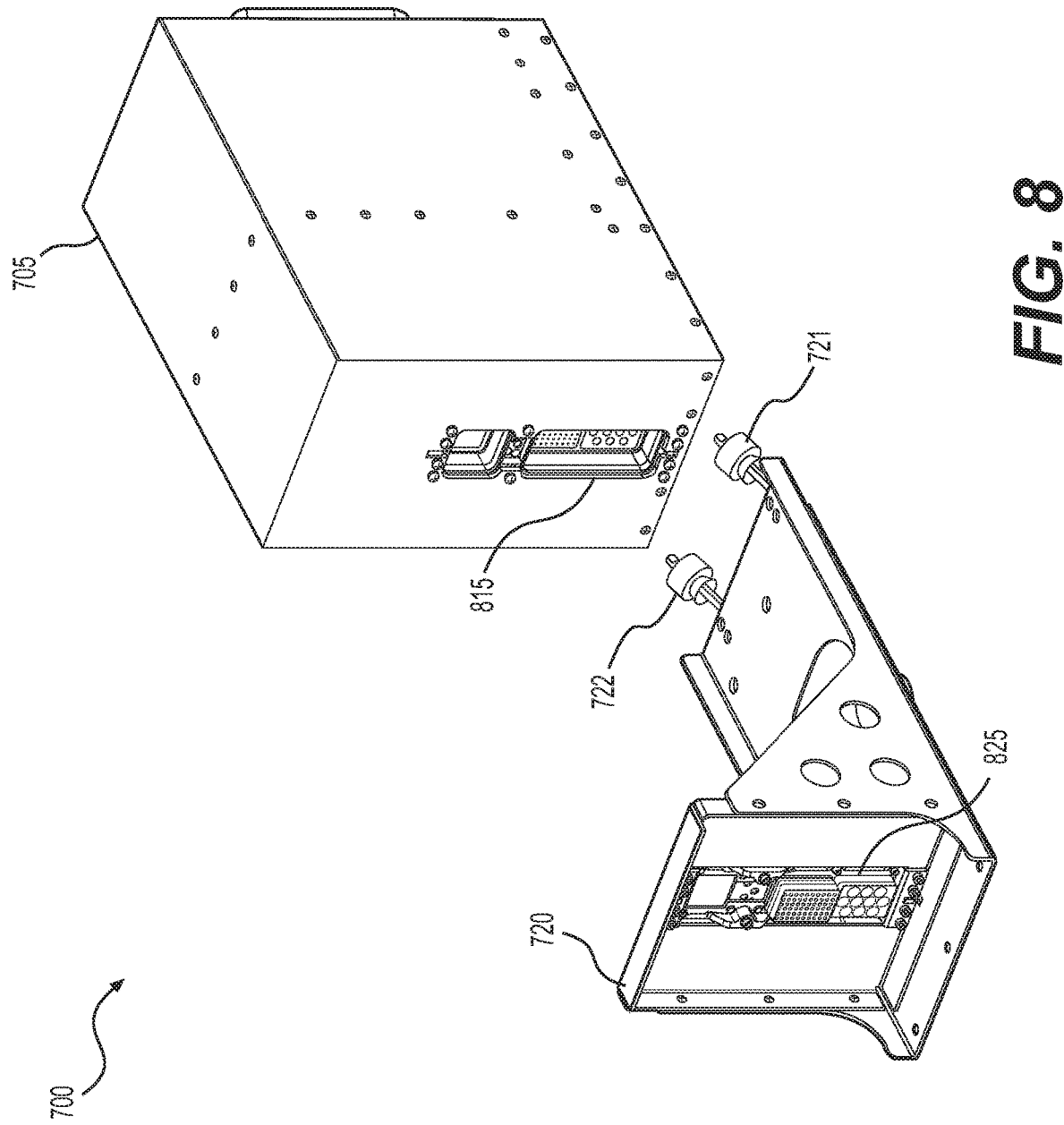
FIG. 8 shows a perspective view of the APU of FIG. 7 with a battery module removed from a rack.
Figure 9:
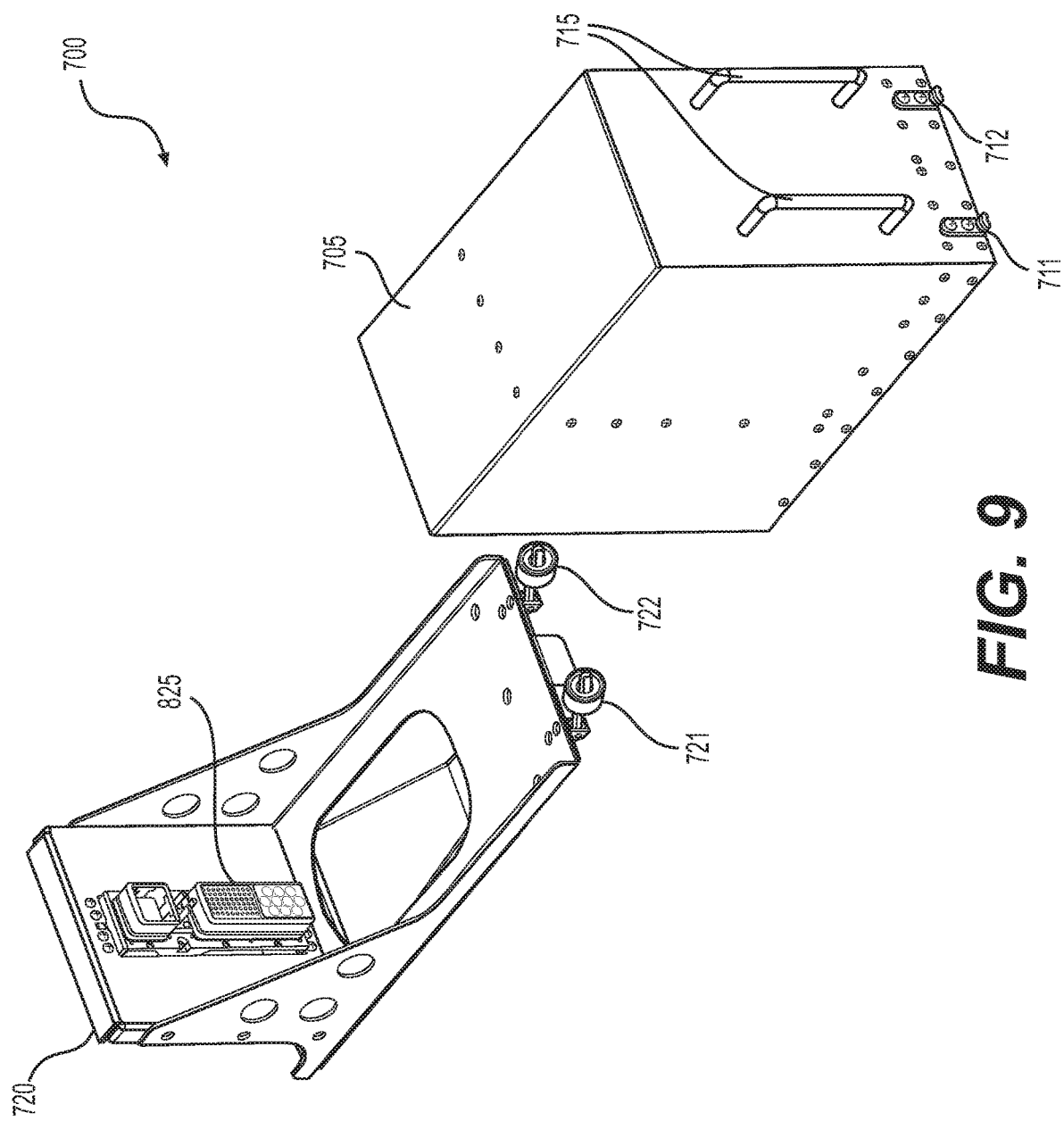
FIG. 9 shows a rotated perspective view of the APU and rack of FIG. 8.

FIG. 8 shows a perspective view of hybrid APU 700 with battery module 705 removed from rack 720. FIG. 9 shows another perspective view of hybrid APU 700, rotated ninety degrees from the view of FIG. 8. FIGS. 8 and 9 are best viewed together with the following description. Battery module 705 may include a receptacle 815 for electrically connecting with a connector 825 of rack 720. The electrical connection between receptacle 815 and connector 825 may include a combination of large-diameter, high-current pins/sockets (e.g., for bulk charging and discharge), medium-diameter, medium-current pins/sockets (e.g., for top/trickle/cell-balance charging), and small-diameter, low-current pins/sockets (e.g., for signal communication). In an embodiment, the large-diameter, high-current pins/sockets for conducting main electrical power are longer to provide a first-mate connection when mounting battery module 705 in rack 720 and a last-break connection when dismounting. Meanwhile, the small-diameter, low-current pins for signal communication are shorter such that they provide a last-mate connection when mounting and a first-break connection when dismounting. An example of connector 825 is an ARINC 600 connector.

In operation, when receptacle 815 connects with connector 825, a signal is transmitted (e.g., from integrated controller 1) via the shorter signal pins, which activates a relay to close within battery module 705 to allow flow of electrical power, thereby preventing arcing between the high current pins/sockets of the receptacle 815 and connector 825 during mounting of battery module within rack 720. Whenever signal pins/sockets are disconnected, the internal relay of battery module 705 automatically opens to stop electrical current, then the longer, high-current pins/sockets are last to disconnect. Since no electrical current is flowing, no arcing occurs during unmounting. The relay is, for example, a bi-stable (e.g., latching) relay that receives a pulse of energy to its coil to change its contact position between a closed relay and an open relay. Without power, the closed (e.g., "conduct") and open modes of the relay are maintained.

If only one battery module 705 is mounted in one of a plurality of racks 720, charging or discharging of this battery module 700 ceases when unmounted and any existing current in the electrical bus junction box 802, FIG. 1 is rerouted to main battery 102, which may or may not be hot-swappable. If one of a plurality of battery modules 705 is unmounted, the remaining mounted battery modules 705 may pick up the resulting excess charge/discharge under control of integrated controller 1. If none of battery modules 705 are mounted within a specified time period, integrated controller 1 may shut down remaining loads to preserve charge of main battery 102.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

We claim:

1. An auxiliary power unit (APU) for an aircraft, comprising:
one or more battery modules for storing electrical power; and
an integrated controller adapted to operate the one or more battery modules for electrically powering aircraft subsystems for preflight readiness,
wherein the integrated controller is adapted to receive instructions remotely via a mobile device, and the APU provides non-essential power for responding to incoming status requests and commands from the mobile device.

2. The APU of claim 1, wherein the APU is operable independently from cockpit preset instructions.

3. The APU of claim 1, wherein the APU is operated manually to power subsystems that are manually controlled independently of the integrated controller.

4. The APU of claim 1, wherein the APU operates remotely without an operator in attendance at the aircraft.

5. The APU of claim 1, wherein the APU operates without producing air pollution.

6. The APU of claim 1, wherein electrical power is directed via the integrated controller from the APU to one or more of the aircraft subsystems during an emergency or unexpected loss of an electrical power source.

7. The APU of claim 1, wherein the integrated controller determines an amount of time and operating profile for preconditioning a cabin of the aircraft based on an available charge capacity of the one or more battery modules, an outside air temperature, a current temperature of the cabin, a target temperature for the cabin, and a target time for reaching the target temperature.

8. A remotely operated system for preflight preparation of an aircraft, comprising:
a plurality of preconditioning subsystems for preconditioning the aircraft in preparation for a flight;
an auxiliary power unit (APU) having one or more battery modules for storing electrical power, the APU being electrically coupled with the plurality of preconditioning subsystems;
an integrated controller electrically and communicatively coupled with the APU and the plurality of preconditioning subsystems for monitoring the APU and the preconditioning subsystems and for controlling flow of electrical power between the APU and the preconditioning subsystems; and
a remote user-interface device communicatively coupled with the integrated controller for displaying information from the APU and the plurality of aircraft preconditioning subsystems and for receiving user input for controlling the APU and the preconditioning subsystems.

9. The remotely operated system of claim 8, wherein the APU provides electrical power to the integrated controller.

10. The remotely operated system of claim 8, wherein the APU and the integrated controller are located onboard the aircraft.

11. The remotely operated system of claim 8, wherein the APU produces sound and pollution at lower levels than are produced by a gas-powered APU and the APU is operable without personnel an operator in attendance.

12. The remotely operated system of claim 8, wherein the integrated controller provides a preconditioning profile for adjusting a temperature onboard the aircraft based on a current temperature, an outside air temperature, a target temperature, a target time to reach the target temperature, and a state-of-charge of the APU.

13. The remotely operated system of claim 12, wherein the target temperature and the target time are received at the integrated controller via the remote user-interface device.

14. A system for remotely operating an auxiliary power unit (APU) of an aircraft, comprising:
the APU having one or more battery modules electrically coupled with a main battery, an electrical bus junction box, and an integrated controller;
the integrated controller having a memory for storing software and a processor for executing instructions of the software, the integrated controller further comprising an input/output data bus for transmitting and receiving data with the APU, the main battery, and the electrical bus junction box; and
a remote interface communicatively coupled with the integrated controller, wherein the remote interface is adapted for displaying data from the APU and the main battery and for receiving user instructions for transmission to the integrated controller for governing flow of electrical current between the APU and the main battery and the electrical bus junction box.

15. The system of claim 14, wherein the one or more battery modules are electrically coupled to an engine starter-generator via the electrical bus junction box.

16. The system of claim 15, wherein the integrated controller regulates output voltage during charging of the one or more battery modules to prevent excessive current and subsequent overheating of the engine starter-generator.

17. The system of claim 15, wherein the APU provides electrical current to reduce a load of the engine starter-generator during critical flight stages.

18. The system of claim 14, wherein the integrated controller determines when the main battery is depleted and recharges the main battery from the one or more battery modules of the APU.

19. The system of claim 14, wherein the integrated controller preheats the main battery by discharging the one or more battery modules of the APU to power a battery heater.

* * * * *